Nov. 21, 1933. W. B. BRONANDER 1,935,613
BISCUIT PACKAGING AND CARTONING MACHINE
Filed July 17, 1928 10 Sheets-Sheet 1

Fig. 1.

INVENTOR
Wilhelm B. Bronander
BY
Sydney H. Prescott
ATTORNEY

INVENTOR
Wilhelm B. Bronander
BY
Sydney J. Prescott
ATTORNEY

Nov. 21, 1933.  W. B. BRONANDER  1,935,613

BISCUIT PACKAGING AND CARTONING MACHINE

Filed July 17, 1928    10 Sheets-Sheet 3

INVENTOR
Wilhelm B. Bronander
BY
Sydney H. Prescott
ATTORNEY

Nov. 21, 1933.   W. B. BRONANDER   1,935,613
BISCUIT PACKAGING AND CARTONING MACHINE
Filed July 17, 1928   10 Sheets-Sheet 4

INVENTOR
Wilhelm B. Bronander
BY
Sydney F. Prescott
ATTORNEY

Nov. 21, 1933.  W. B. BRONANDER  1,935,613
BISCUIT PACKAGING AND CARTONING MACHINE
Filed July 17, 1928  10 Sheets-Sheet 6

Nov. 21, 1933.    W. B. BRONANDER    1,935,613
BISCUIT PACKAGING AND CARTONING MACHINE
Filed July 17, 1928    10 Sheets-Sheet 8

INVENTOR
Wilhelm B. Bronander
BY
Sydney H. Prescott
ATTORNEY

Nov. 21, 1933.  W. B. BRONANDER  1,935,613
BISCUIT PACKAGING AND CARTONING MACHINE
Filed July 17, 1928   10 Sheets-Sheet 9

INVENTOR
Wilhelm B. Bronander
BY
Sydney Prescott
ATTORNEY

Nov. 21, 1933. W. B. BRONANDER 1,935,613
BISCUIT PACKAGING AND CARTONING MACHINE
Filed July 17, 1928 10 Sheets-Sheet 10

INVENTOR
Wilhelm B. Bronander
BY
Sydney J. Prescott
ATTORNEY

Patented Nov. 21, 1933

1,935,613

UNITED STATES PATENT OFFICE 1,935,613

BISCUIT-PACKAGING AND CARTONING MACHINE

Wilhelm B. Bronander, Montclair, N. J., assignor to American Machine & Foundry Company, a corporation of New Jersey Application July 17, 1928. Serial No. 293,397

22 Claims. (Cl. 93—2)

This invention relates to packaging and cartoning machines for biscuits and other articles, the purpose being to automatically group, wrap and seal the articles and then place the wrapped package so formed within a carton, finally closing and sealing the carton.

The principal object of this invention is to provide an organized machine for performing the above operations automatically, without the necessity of human hands touching the biscuits or the package from the time the separate biscuits are fed into the machine up to the delivery of the completed carton. As a result, better and more sanitary packages than heretofore are produced and they are produced more rapidly. Still another object of the invention is to provide a mechanism for transferring groups of the biscuits to the wrapping mechanism in response to the completion of said groups, so that if a group is not completed for any reason it will not be transferred, thus avoiding packages having less than the desired number of biscuits. Another object is to produce a machine of this type which, due to the vertical arrangement of the wrapping mechanism, is economical of floor space. Still another object is to produce such a machine in which a single biscuit feed and single cartoning unit is arranged to cooperate selectively with either one or both of a plurality of wrapping units, thus attaining greater immunity from shut-downs and high capacity, despite the fragile nature of the biscuits which forbids severe handling. Still another object is to provide such a machine in which the wrapper sheets and cartons are fed only when the corresponding group or package to be wrapped thereby is on its way.

With these and other objects not specifically mentioned in view, the invention consists in certain constructions and combinations which will be hereinafter fully described and then specifically set forth in the appended claims.

In carrying the invention into effect, there is provided in combination, wrapping mechanism, means for feeding articles, means cooperating with the feeding means to successively collect said articles into groups having the predetermined number and arrangement desired in the completed package, together with means set into operation by the completion of each group for transferring said group to the wrapping mechanism. In the best constructions, the said collecting means include a stop against which the articles are fed, and the transfer means will include means controlled by the pressure of articles against said stop. In the preferred construction, the wrapping mechanism includes a tower, together with means of conveying a succession of the groups up in said tower and then down again, and stationary folders in the tower coacting with said conveying means. The best constructions will also include mechanism for inserting traveling objects in cartons, comprising means for forwarding the objects, such as wrapped groups of biscuits, and means for forwarding open cartons in a path parallel to the path of the objects, with a carton opening next to each object, and means for pushing the objects into the cartons during said forwarding. The means above referred to may be widely varied in construction within the scope of the claims, for the particular machine selected to illustrate the invention is but one of many possible embodiments of the same. The invention, therefore, is not to be restricted to the precise details of the structure shown and described.

In the accompanying drawings:

Fig. 1a is a front elevation of the cartoning unit; Figs. 1 and 1a, when joined together on the line 1—1, form a complete front elevation of the biscuit wrapping and cartoning machine;

Fig. 1b is an enlarged view of a detail shown in Fig. 1a;

Fig. 2 is a plan view of the cartoning unit shown in Fig. 1a;

Fig. 7 is a detail plan view showing the paper feed and biscuit advancing means on an enlarged scale;

Fig. 7a is a detail plan view of the paper cutter;

Fig. 8 is a side elevation of the parts shown in Figs. 7 and 7a;

The principal parts of the particular embodiment shown in the accompanying drawings which form a part of this specification and in which like characters of reference indicate the same or like parts, are the following: a biscuit feed; a pair of wrapping towers past which the biscuit feed carries the biscuits to be wrapped; a biscuit transfer which cooperates with the feed and the towers to transfer groups of biscuits into the tower; a paper feed supplying the wrapping material; a package transfer which transfers the wrapped groups or packages from the tower to a forwarding means; a carton feed from which collapsed cartons are ejected; a carton opening and forwarding device arranged to receive these cartons and forward them in open condition; package inserting means for inserting the packages into the cartons during forwarding; carton sealing and closing devices past which the filled cartons are forwarded; and carton ejecting and delivery means operating on the cartons after sealing. In addition to these parts there is provided a suitable wrapping tower drive from which are driven the biscuit transfer and the paper feed for the tower, and an intermittent drive for the conveyor belt, also driven from a shaft of the wrapping tower drive.

Biscuit feed

Figure 1:
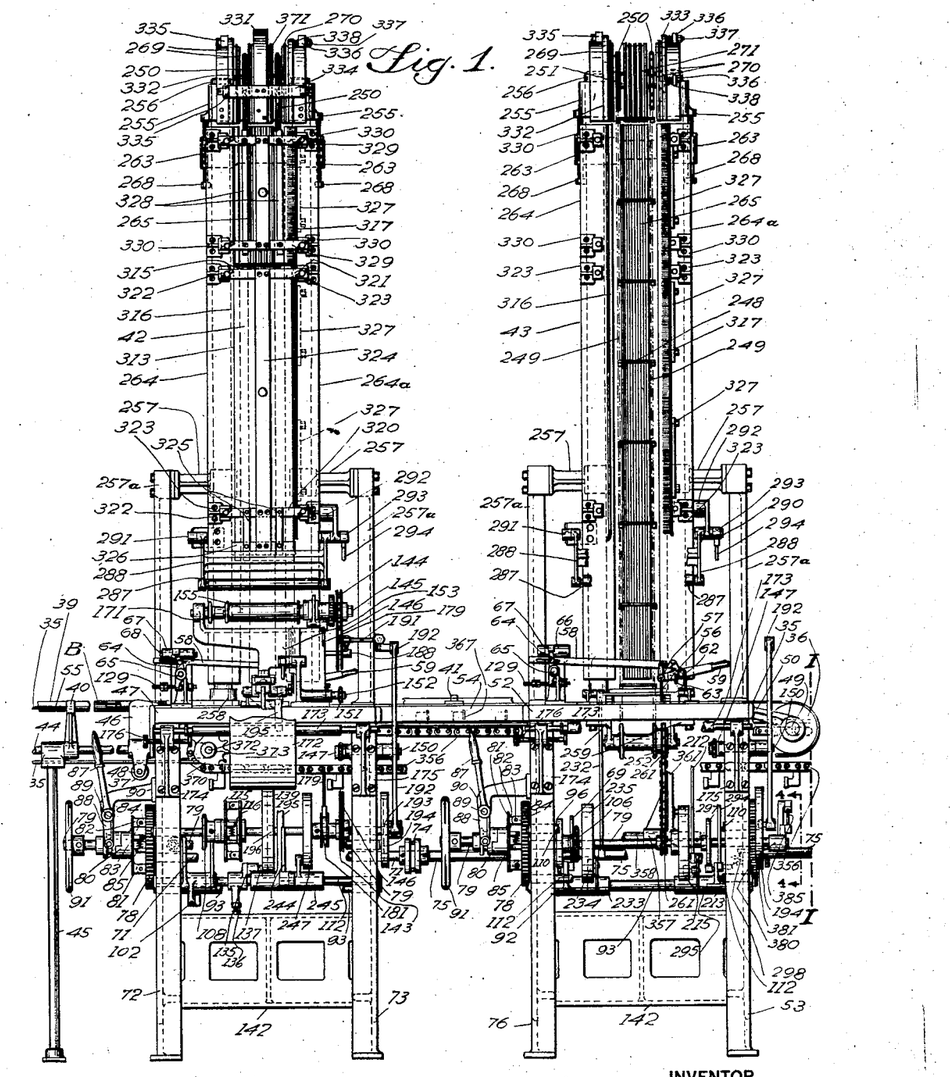
Fig. 1 is a front elevation, broken away in parts, of the wrapping portion of the machine, comprising the two wrapping units.
Figures 3, 4:
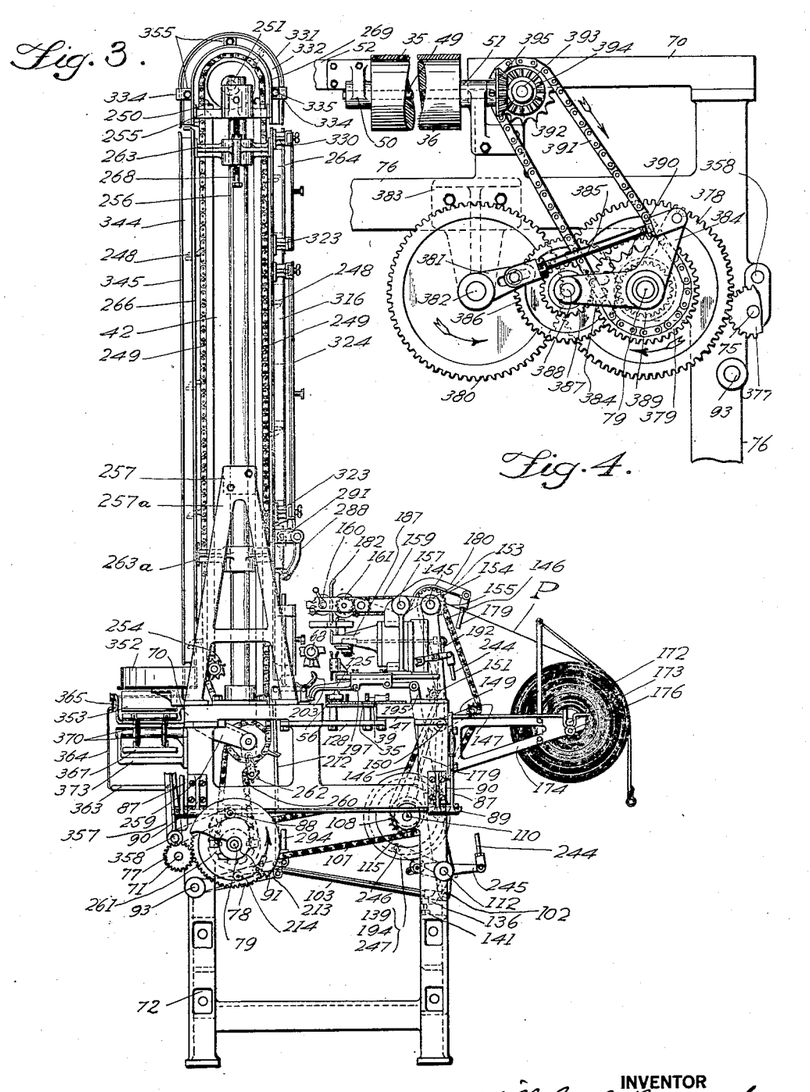
Fig. 3 is a side elevation of one of the two similar wrapping units shown in Fig. 1.
Fig. 4 is a fragmentary elevation showing the intermittent belt drive which feeds the biscuits to the wrapping units shown in Fig. 1.

Referring to Figs. 1 and 3, two rows of biscuits B are fed into the machine by placing them in piles of the desired height flat across a feed belt 35, which is intermittently driven by means hereinafter described, running over the pulleys 36 and 37 and over a suitably mounted outboard pulley past both the wrapping towers hereinafter described. Two pairs of guides 38 and 39, held above the belt 35 by brackets 40 and 41, guide the biscuits on the belt respectively to the towers 42 and 43. The brackets 40 are mounted on rods 44 supported by floor stands 45 and by bearings 46 attached to a table 47 of the tower 42. The bearings 46 also carry a shaft 48 on which the pulley 37 rotates. The pulley 36 is mounted on a shaft 49 supported in brackets 50 and 51, which are attached to a table 52 and to a pedestal 53, respectively, of the tower 43. The brackets 41 are fastened to a frame 54 which connects the two tables 47 and 52. A plate 55 placed below the overhanging portion of conveyor belt 35 prevents the latter from sagging.

Figure 5:
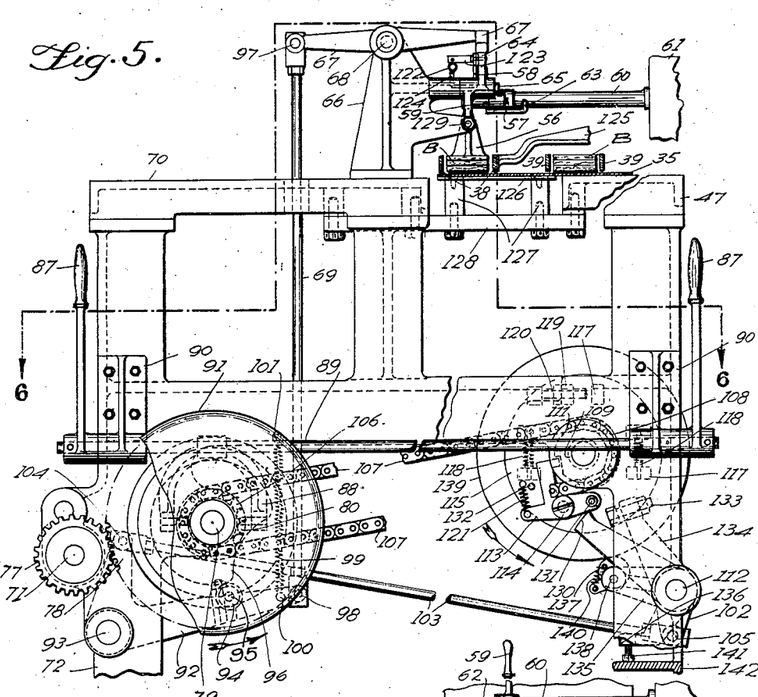
Fig. 5 is a fragmentary elevation, partly in section, of the drive for the transfer device and paper feed.

Each row of biscuits is fed by a belt 35 against a stop plate 56 (Figs. 1, 5 and 6) which, when a group of biscuits have collected containing a sufficient number to move it, swings on a horizontal stud 57, thereby actuating a bar 58 and operating the mechanism which pushes the biscuits into the respective tower. The stud 57 is carried by a handlever 59 mounted on a rod 60 attached to the bracket 61. The handlever 59 is held so the stop plate 56 is in the path of the biscuit by a spring 62 and rests on a rectangularly bent rod 63 projecting from rod 60. In case of faulty biscuits or other temporary feeding trouble the handle of lever 59 is held down by the operator, thereby lifting the stop plate 56 so that the damaged biscuits can pass below it and be carried away by the feed belt without actuating the plate 56. When the belt again feeds perfect biscuits, the lever 59 is released, whereupon the stop plate 56 descends and again functions as above described.

Figure 6:
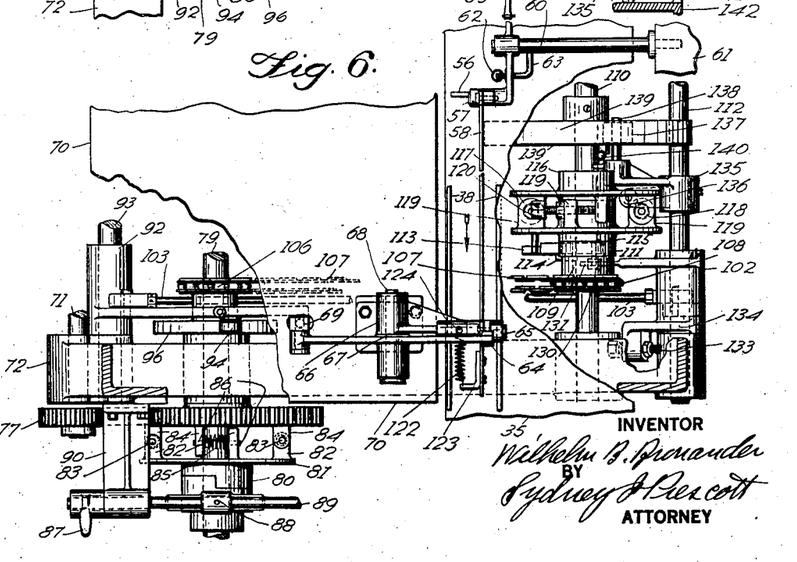
Fig. 6 is a plan view, partly broken away, of the parts shown in Fig. 5.

When the plate 56 is swung back by the advancing biscuits, the bar 58 is pushed in the direction shown by the arrow in Fig. 6, and thereby swings a lever 64 pivoted on a stud 65 in a bracket 66 into engagement with the under side of a lever 67 which is pivoted on a stud 68 in a bracket 66 and is made to rock up and down by a cam-operated rod 69, this engagement stopping the motion of the lever 67. The plate 56 is held in forward position by means of a spring 122 having a tension such that the plate 56 will swing the lever far enough to cause the stopping of lever 67 only when subject to the feeding pressure resulting from the frictional engagement of a complete group of biscuits on the feed belt. The brackets 66 are attached to the rear tables 70 of the towers 42 and 43. While the levers 67 rest in engagement with levers 64, the biscuit and wrapper feeding into the towers takes place.

Wrapping tower drive (including biscuit transfer and paper feed drives)

A shaft 71 (Figs. 1, 5, 6 and 12), which is journalled in bearings in pedestals 72 and 73, is joined by a coupling 74 to the motor driven shaft 75 supported in bearings of the pedestals 53 and 76. On the shafts 71 and 75 are mounted spur gears 77 which mesh with the spur gears 78 on shafts 79 supported in bearings of the pedestals 72, 73 and 53, 76, respectively.

In order that the two wrapping units may be selectively operated singly, or both together, the clutches 80 are provided, discs 81 of which have projecting lugs 82 carrying adjustable screws 83 in engagement with lugs 84 of spur gears 78, cushioning springs 85 held by studs 86 pressing on lugs 84 and keeping screws 83 in position. The clutches 80 are actuated by means of handlevers 87 operating a shift fork 88 mounted on shaft 89 supported in bearings 90 attached to pedestals 72 and 76, respectively. A handwheel 91 is mounted on shaft 79 so that the latter can be turned by hand when clutches 80 are out of engagement.

For the purpose of driving the biscuit transfer and paper feed only when a complete group of biscuits is ready for wrapping, the drive and drive control hereinafter described is provided. The lever 64, by stopping the downward motion of the lever 67, also stops further motion of a bell crank lever 92 (Figs. 5 and 6), which is mounted on a shaft 93 and has a cam roller 94 on a stud 95 in engagement with a cam 96 on the shaft 79. The levers 67 and 92 are connected by the rod 69 fastened to them by studs 97 and 98, respectively. A spring 99 attached to a post 100 on the lever 92 and anchored to a post 101 on the pedestals 72 and 76, respectively, provides the contact tension between roller 94 and cam 96. The motion of lever 92, when not stopped by lever 64, causes the cam roller 94 to make contact with the low portion or dwell of cam 96.

To set in motion a shaft 110 from which the biscuit transfer and paper feed are driven, as a result of completion of the group on the feed belt, the lever 92 is connected with one arm of a three armed bell crank lever 102 by a rod 103 attached to the lever and arm by the studs 104 and 105, respectively. A sprocket 106 is mounted on the shaft 79 and by means of a chain 107 drives a sprocket 108 which runs freely on a bushing 109 on the shaft 110 and has attached to it a one-tooth ratchet 111. The lever 102 on the shaft 112, in its position of rest, allows a pawl or dog 113 to engage with the ratchet 111. This pawl is held by a stud 114 attached to a coupling member 115 which is loosely mounted on shaft 110, while the coupling member 116 is keyed to this shaft. The connection between the two coupling members consists of three projecting lugs 117 on the member 116, two of which have shock absorbing springs 118, and of three projecting lugs 119 on member 115, one of which has an adjustable stop screw 120. On withdrawal of the knockout lever 130, which in rest position of 115 normally holds the pawl away from the ratchet, pawl 113 is pulled into engagement with ratchet 111 by a spring 121, and the free running sprocket 108 transmits its rotation to the coupling member 115, the lugs of which transmit this motion to coupling member 116, thereby turning shaft 110 and operating the paper feed and biscuit transfer.

As soon as a group of biscuits B has left the feed belt 35, the bar 58 is pulled back by the spring 122 which is attached to an angle piece 123 on a bar 58 and is fastened to post 124 in bracket 66. The biscuits are pushed off the feed belt 35 by the plunger or pusher member 125, which as shown (Fig. 10) has a pair of face portions of proper length to push a completed group laterally off the feed belt. The feed belt at its delivery point below the plunger is supported by the plate 126 which is attached to blocks 127 resting on bars 128 fastened to the undersides of tables 47 and 70.

Since bar 58 is fastened to lever 64, the latter, which has a swinging motion limited by the adjustable screw 129 carried by bracket 66, is pulled away from under lever 67, thereby restarting the motion of the latter which had been arrested by lever 64.

To render the drive of the transfer and paper feed self stopping after transferring and feeding paper for one group, after the stop 56 has moved back to its forward position, the free end 130 of an arm of lever 102 will come in the way of pawl 113 and will bear against roller 131 carried by the latter, thereby knocking pawl 113 out of engagement with ratchet 111. Coupling members 115 and 116 thus come to a stop, thereby arresting paper and biscuit feeding. The pin 132 limits the outward swing of pawl 113, while the adjustable stop screw 133 fastened in arm 134 of lever 102 limits the inward swing of lever 102.

To bring shaft 110 and coupling 115 to a quick stop in a definite rest position, there is mounted on shaft 112 a bell crank lever 135—136 which has the roller 137 eccentrically mounted on pin 138 in arm 135. The roller 137 slides on the circular periphery of cam 139 mounted on shaft 110 and is held by a spring 140 which prevents its free turning on pin 138 so that when cam 139 comes to a stop, the roller jams the cam by virtue of said roller's eccentricity. This lever 135, having the adjusting screw 141 on its arm 136 bearing against cross-frame 142, regulates the contact pressure between roller 137 and cam 139. It will thus be seen that the means which transfers the group of biscuits to the wrapping tower is set into operation by the completion of a group of biscuits and that, therefore, if for any reason the group is not completed, it will not be transferred.

Figures 7, 7A, 8:
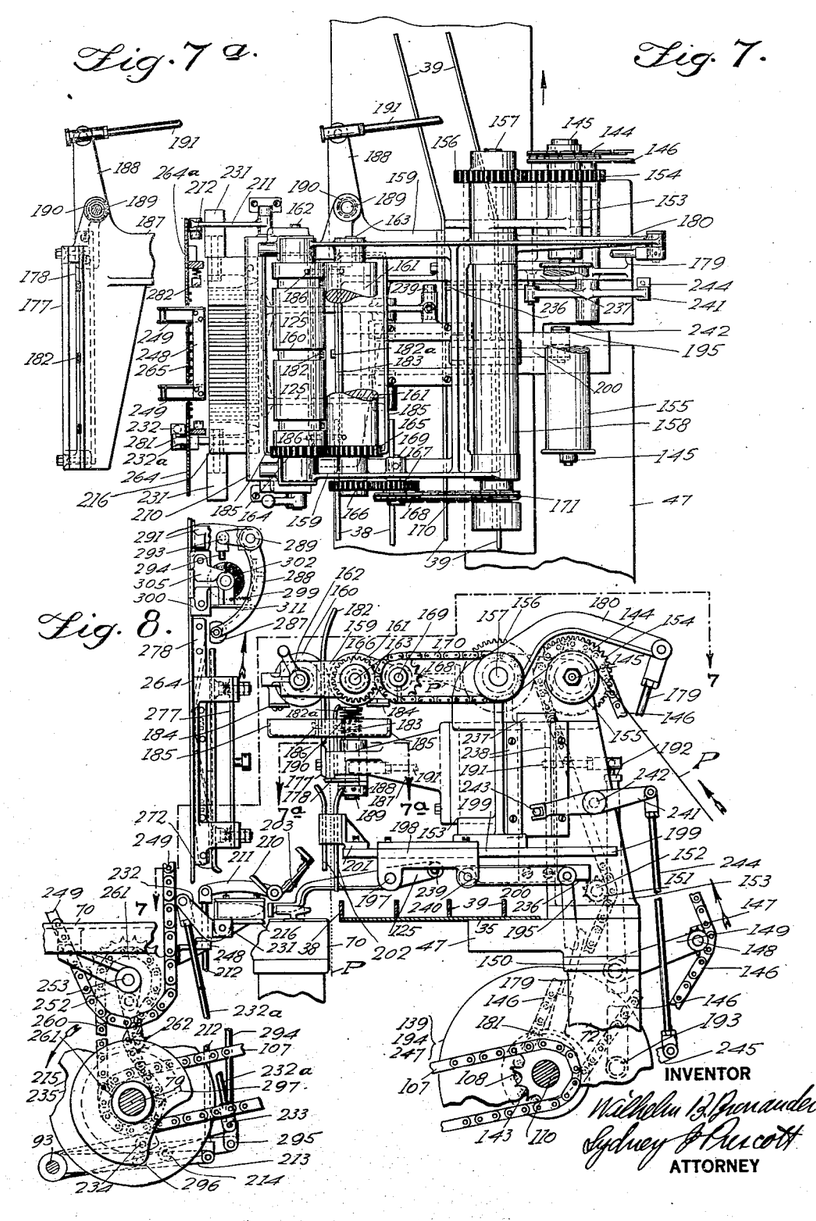

Before the biscuits reach the stop plate 56, a sprocket 143 mounted on the shaft 110 and set in motion during the transfer of one of the groups of biscuits drives a sprocket 144 on a shaft 145 by means of a chain 146 (Figs. 3, 7 and 8). This chain runs over an idler 147 on a stud 148 carried by a lever 149 pivoted on a stud 150 in pedestals 73 and 53, and over an idler 151 on a stud 152 attached to a bracket 153. To the sprocket 144 is attached a spur gear 154, both running loosely on the shaft 145 supported in the bracket 153. The overhanging end of the shaft 145 carries a loosely mounted paper guide roller 155. The spur gear 154 meshes with a spur gear 156 on a shaft 157 in the bracket 153, a shaft 157 carrying the paper drive roller 158. A swinging bracket 159 supported on the shaft 157 carries two paper pull-off rollers 160 and 161 mounted on shafts 162 and 163 and driven by intermeshing spur gears 164 and 165, the shaft 163 having a spur gear 166 in mesh with a gear 167 which together with a sprocket 168 to which it is attached, runs loose on a stud 169. The sprocket 168 is driven by a chain 170 from a sprocket 171 on the shaft 157. The driven rollers 160 and 161 pull the paper P off a paper reel 172 mounted on a shaft 173 held in brackets 174 and 175 attached to the pedestals 72, 73, 76 and 53. Bracket 174 has the adjusting screw 176 by which the lateral position of the paper reel is regulated.

As soon as the rollers 160 and 161 start to pull the paper, bracket 159 swings upward, as indicated by the arrow in Fig. 8, until the necessary length of paper is unreeled, and then descends, feeding the unreeled length of paper between the cutter bars 177 and 178. The cutting of the paper is done as the bracket 159 ascends, this ascent giving a counter-travel to the rollers 160 and 161 sufficient to hold the paper stationary with respect to the cutters. The swinging of the bracket 159 is accomplished by a rod 179 which connects an extending arm 180 of the bracket 159 with an eccentric 181 mounted on the shaft 110. The paper while in the rollers 160 and 161 is guided to the forward end of the biscuit group B to be wrapped, by the strips 182 and 182a attached to the cross strips 183, roller 160 being provided with grooves for the passage of guide strips 182a. Scraper plates 184 fastened to the bracket 159 prevent the accumulation of wax from the paper P on the rollers. The scraped wax is collected by two receptacles 185 fastened on hooks 186 attached to cross strips 183, which are carried by a bracket 187 affixed to the bracket 153.

Figures 9, 9A, 9B, 10:
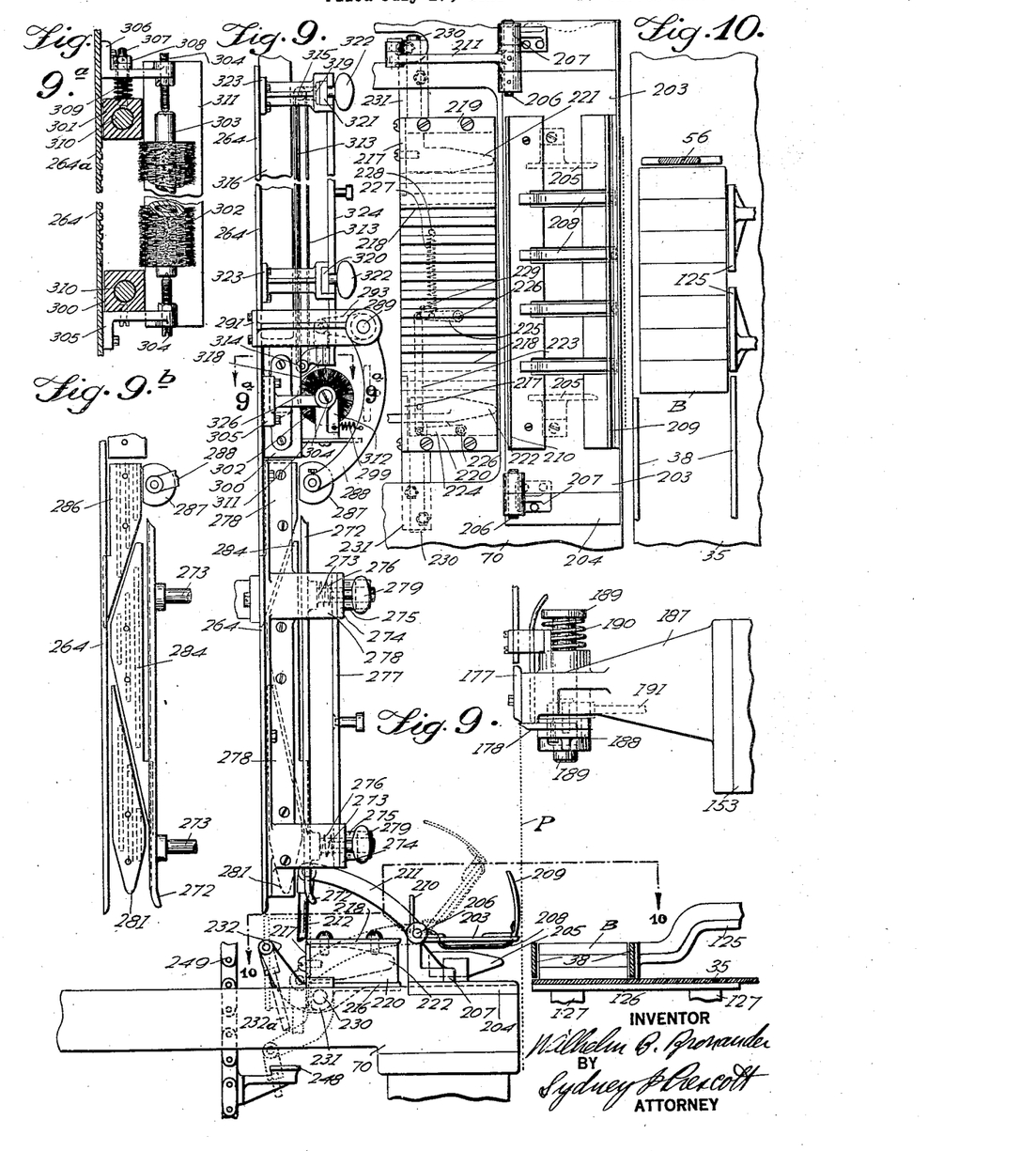
Fig. 9 is a side elevation of the lower portion of one of the wrapping towers showing the biscuit wrapping parts viewed from the near side of the table 70 in Fig. 10, the guides 38 being shown in section on a line passing through one side of the plate 204 in Fig. 10.
Fig. 9a is a cross section on line 9a—9a of Fig. 9.
Fig. 9b is a detail of Fig. 9 showing parts of the folding device.
Fig. 10 is a fragmentary plan view of Fig. 9 showing details of the wrapper folding and wrapper tucking device.

The cutter bars 177 and 178 for cutting the paper to the desired length, are carried by bracket 187, the former being stationary and the latter being mounted on the arm 188 swinging on stud 189 (Figs. 7a and 9). This stud has on it a spring 190 which pulls the bar 178 tight against the cutting edge of the bar 177. The bar 178 is operated by a rod 191 connected with a lever 192 pivoted on the stud 150, lever 192 having a cam roller 193 engaging with a cam 194 (Figs. 1 and 8).

*Biscuit transfer and cooperating wrapping means*

The pusher member 125, which takes the biscuits B off the feed belt 35, is operated from shaft 110 by a cam lever 195 swinging on shaft 112 and having a roller 196 actuated by cam 139 on shaft 110. The pusher member 125 swings on a shaft 197 held in a block 198 which slides on a bar 199 attached to the bracket 153. A link 200 connects the block 198 with the cam lever 195. A bracket 201 attached to the bar 199 carries paper guide strips 202. It will be evident that the pusher 125 at tower 43 must have a longer stroke to push biscuits from the far side of the conveyer. For this purpose the leverage of cam lever 195 may be greater and the contours of cam 139 may be higher, preferably the latter. As the two structures are otherwise identical, only one is described in the interest of brevity.

Figures 17, 18, 19, 20, 21:
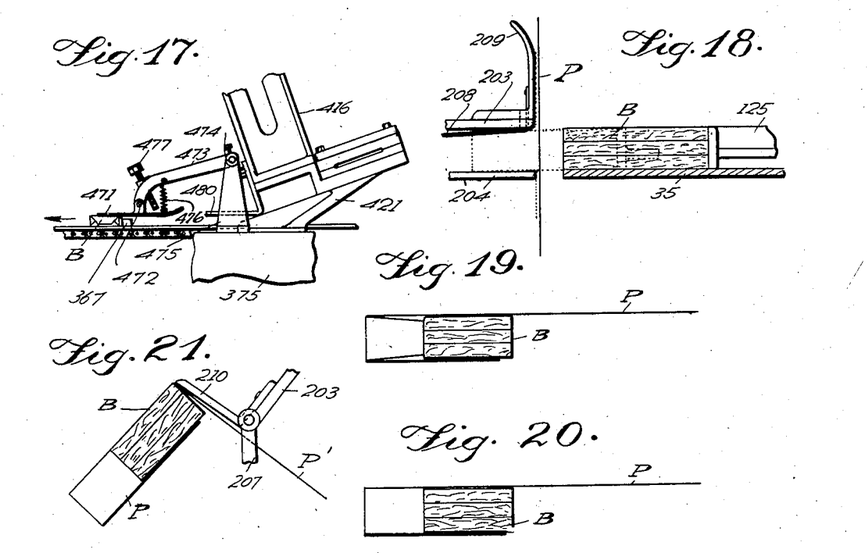
Fig. 17 is a side elevation showing a detail of the device for guiding the biscuit package into the opened carton.
Figs. 18 to 26 are side elevations showing the successive stages of the biscuit wrapping and sealing process.

As the pusher member 125 delivers one group of biscuits B into the preliminary wrapping pocket below the swinging paper folding guide 203 (Fig. 9), the paper P is carried along with it, thereby wrapping it around the biscuits (Fig. 18). The pocket referred to has a swinging guide 203 as its cover, while its base is formed by a plate 204 attached to the table 70, and its sides are formed by the paper guides or fingers 205 which compact the biscuits and tuck in the sides of the paper wrapper (Fig. 19). The top plate 203 swings on studs 206 held in brackets 207 and carries the springs 208 which press down against the biscuits, thereby drawing the paper tight, while entering the first wrapping stage (Fig. 18). An angle piece 209 attached to the front end of the top plate 203 acts as paper guide, while an angle piece 210 attached to the rear end of plate 203 acts as a paper folder (Fig. 21). The top plate 203 is actuated by a lever 211 (Figs. 8 and 9), which through a rod 212 is operated by a cam lever 213 having a roller 214 in engagement with a cam 215 on the shaft 79.

From the preliminary folding pocket, the biscuits are carried by the pusher 125 into a swinging transfer chamber 216 (Figs. 9 and 10), the top plate 203 in the meantime having swung upwards to clear the way. The chamber 216 consists of the base plate 216, side plates 217, and two top plates 218, the top and bottom plates being provided with grooves to avoid accumulation of wax. The plates 217 and 218 are attached to blocks 219 and 220 on the base plate 216. Two tuckers 221 and 222 perform the side tucking on the two ends of the package (Fig. 20). Side tucker 221 is fixed to the block 219; side tucker 222 is mounted on bar 223 carried by the links 224 and 225 swinging on studs 226 on the base plate, and is movable to allow for variation in the thickness of the biscuits. To link 225, the spring 227 anchored on spring post 228 is fastened, and pin 229 limits the motion of the links. The base 216 is pivoted on studs 230 supported in bearings 231 attached to table 70. An arm 232, extending from the chamber 216, is connected by a rod 232a, with a cam lever 233 swinging on the shaft 93 (Fig. 8) and having the roller 234 actuated by a cam 235 on the shaft 79.

After the biscuits have entered the chamber 216, plate 203 swings back (Fig. 8), and the chamber 216 swings from the horizontal to a vertical position, the protruding end of the wrapper thereby engaging the angle piece 210 which folds the paper around the upper end of the package (Fig. 21). On its return stroke, pusher 125 must be lifted to clear the biscuits on belt 35, which would otherwise be in its way. This is accomplished by a rail 236 (Fig. 8), which is attached to a bar 237 sliding in the bracket 153 and held in place by a cover plate 238. On the return stroke of pusher 125, a roller 239 carried by it engages with the inclined surface 240 of the rail 236, forcing the roller beneath the rail 236 and thereby lifting the front end of the pusher 125. At the end of its backward stroke, the pusher is released from its raised position by the upward movement of the bar 237, which raises the rail 236, thus bringing the pusher behind the next group of biscuits. The sliding bar 237 is operated by a lever 241 which swings on a stud 242 and bears against the pin 243 in the bar 237. The lever 241 is connected by a rod 244 with a cam lever 245 fulcrumed on the shaft 112 (Figs. 3 and 8). The cam lever 245 has a cam roller 246 and is operated by cam 247 on shaft 110.

*Wrapping tower*

Since the two towers and their accessories are identical in structure, their parts are similarly numbered, and only one is described in the interest of brevity.

After swinging to vertical position, the partly wrapped biscuits are taken out of the chamber 216 by means of cross bars 248 of conveyor chains 249, which carry the packages up the wrapping towers 42 and 43. The chains 249 (Figs. 1, 3, 8 and 9) run over upper sprockets 250 mounted on shafts 251, over lower sprockets 252 on shafts 253, and over idler sprockets 254. The shaft 251 is supported by the brackets 255 mounted at the top of the posts 256 supported by the bearing brackets 257 and 258, the former attached to frames 257a which, together with the latter bracket 258, rest on the table 70. The shaft 253 is supported by brackets 259 mounted on the under side of the table 70, and driven from the shaft 79 by means of a chain 260 which runs over the sprockets 261 and the idler 262. The posts 256 also carry the brackets 263 and 263a, to which are attached the front wall strips 264, 264a and 265, and the rear wall strips 266, 266a and 267, which serve to encase front and back of the towers and to guide the corresponding surfaces of the packages in the towers. These walls are provided with grooves to avoid accumulation of wax. The bracket 263 has adjusting screws 268 by means of which the chains 249 can be tightened. To the brackets 255 are attached the semicircular grooved top walls 269, 270 and 271 of the towers which, together with the front and back walls, serve to form a guideway of inverted U shape along which the package is conveyed up and over the top and down.

Figure 22:
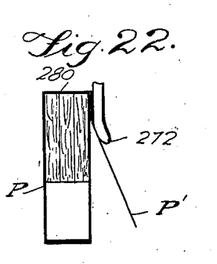
Figure 23:
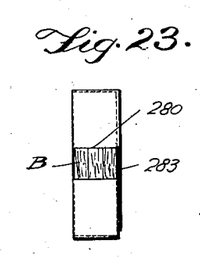

As the package is lifted vertically out of the transfer chambers into the wrapping towers, the paper flap P' (Fig. 22) hanging out from the package, is folded over the upper end of the package by a resilient plate 272 (Figs. 9 and 9b) carried by studs 273 which pass through holes in the cross bars 274 and are held by the nuts 275 at the outer sides of the cross bars, the studs 273 having about them coil springs 276 bearing against the inner sides of the cross bars. The latter are interconnected by a bar 277 and are fastened to brackets 278, attached to the tower walls 264 and 264a, by thumb screws 279 for convenient removal and replacement.

Figure 24:
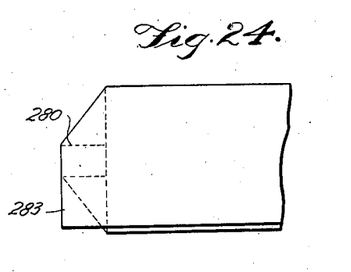
Figure 25:
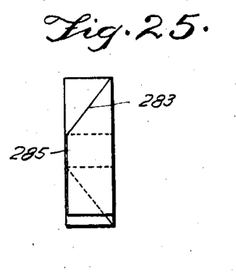
Figure 26:
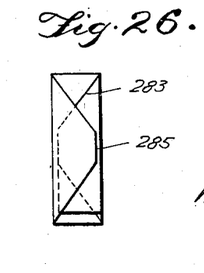

The upper end flaps 280 of the package (Figs. 9, 9b, 23 and 24) are tucked in by means of stationary side tuckers 281 and 282, having inclined flap folding surfaces, which are fastened to the brackets 278, tucker 281 being fixed and tucker 282 being yieldably mounted to allow for irregularities in the thickness of the biscuits. The side flaps 283 of the packages (Fig. 24) are guided over inclined flap folding surfaces of the tuckers 281 and 282 by means of the blocks 284 having similar opposed surfaces, which are fastened to brackets 278 and project into slots provided for this purpose in plate 272. The flaps 283, in passing between the tuckers 281 and blocks 284, are folded over the end of the package and close the same (Fig. 25). The remaining open flaps 285 (Figs. 25 and 26) pass through the space between the tuckers 281 and 282 on the one side, and the front walls 264 and 264a on the other, and are folded over while passing through the inclined space between the upper part of blocks 284 and the lower parts of block 286, which also have corresponding inclined flap folding surfaces.

Upon leaving the tuckers, the flap P' of the wax paper wrapped package is sealed by an electrically heated roll 287 (Figs. 8 and 9), which is fixedly mounted on the ends of arms 288 pivoted on studs 289 and 290 in brackets 291 and 292 (Fig. 1). On the stud 290 and fixed to one of the arms 288 is fastened a lever 293 connected by a rod 294 with a cam lever 295 pivoted on the shaft 93 and having a cam roller 296 running on a cam 297 mounted on the shaft 79 and imparting to the heater an oscillating motion. A spring 298 holds the roller 296 against the cam and a spring 299 pulls the levers 288 against the biscuit package.

Upon leaving the heater 287, the package passes between the two electric heating bars 300 and 301 (Figs. 9 and 9a), which seal the end flaps, while the newly sealed flap P' is being smoothened by a revolving brush 302, which is rotated by contact with the moving package, mounted on a shaft 303 pivoted between two pointed screws 304 carried by brackets 305 and 306 (Fig. 9a) fastened to the walls 264 and 264a of the tower. To bracket 305 is fixedly attached the heating bar 300, which is fixed, while bracket 306 supports the heater 301 which is adjustably mounted to provide for package variations, being attached to studs 307 which can be regulated by nuts 308 and spring 309. Within the heating bars are electric heating units 310. A fiber shield 311 attached to extensions 312 of the brackets 305 and 306 protects the rotating brush from the radiation of heater 287.

To prevent the sides of the package from opening after leaving the sealers 300 and 301, the package is carried between a moving belt 313, supported by rollers 314 and 315, a side rail or guide 316 and the vertically extending side brush 317 (Fig. 1). The rollers 314 and 315 are supported by bearing brackets 318 and 319 (Fig. 9) carried by a frame consisting of cross bars 320 and 321, held by thumb screws 322 in brackets 323 attached to the front walls 264 and 264a of the tower, these cross bars being connected by a bar 324. To the bar 320 are fastened strips 325 which, together with the bar 324, hold a supporting cross bar 326 for roller bearing 318. Side rail 316 is fastened to front wall 264, while side brush 317 is held by strips 327 attached to front wall 264a.

Upon leaving the belt 313, the packages is guided by narrow strips 328 (Fig. 1) fastened to cross bars 329 held by brackets 330. While turning in the upper part of the tower, a wide central inverted U-shaped strip 331 and two narrow side strips 332 and 333 guide the package (Figs. 1 and 3). The strip 331 is held by cross bars 334 fastened to blocks 335 and 336, which in turn are mounted on the top walls 269 and 270. The side strip 332 is rigidly mounted on blocks 335, while side strips 333 is resiliently mounted on blocks 336. The blocks 336 have studs 337 loosely mounted thereon, which hold the side guide 333, and springs 338 which permit yielding movement in response to variations in the width of the packages. On its downward travel, the package is guided by the rear walls 266, 266a and 267, and by the side walls 339 and 340 (Fig. 12), the pressure of the resiliently mounted walls being sufficient to prevent falling of the descending packages. Side wall 339 is resiliently mounted on studs 341 loosely held by bar 342 attached to rear wall 267 and having springs 343. Side wall 340 is rigid, being attached to bar 344 on rear wall 266. Grooved cover plates 345 affixed to bars 342 and 344 retain the descending packages on the tower runways.

*Package transfer to cartoning unit*

Figure 11:
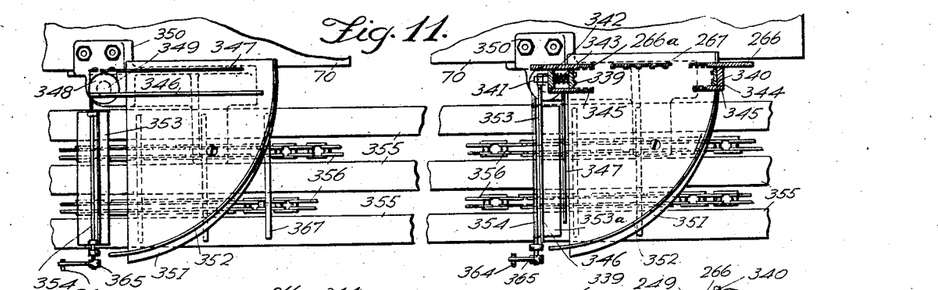
Fig. 11 is an enlarged fragmentary view showing the transfer device for placing the wrapped packages from the towers on the conveyor to the cartoning unit.
Figure 12:
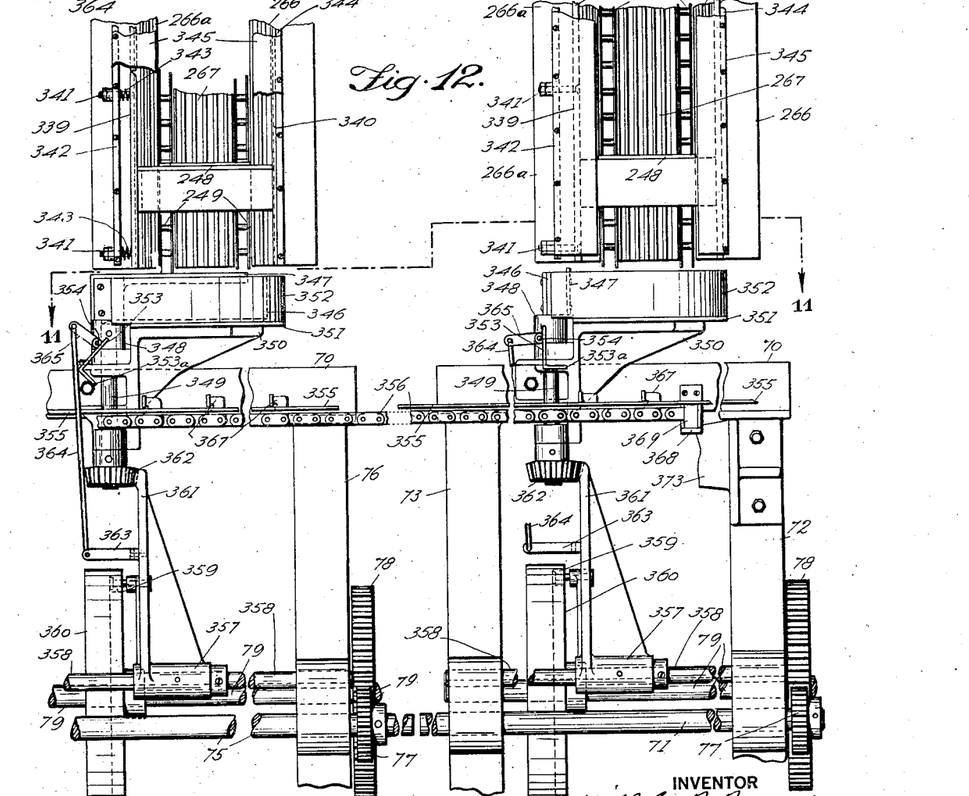
Fig. 12 is an elevation of the parts shown in Fig. 11.
Figure 13:
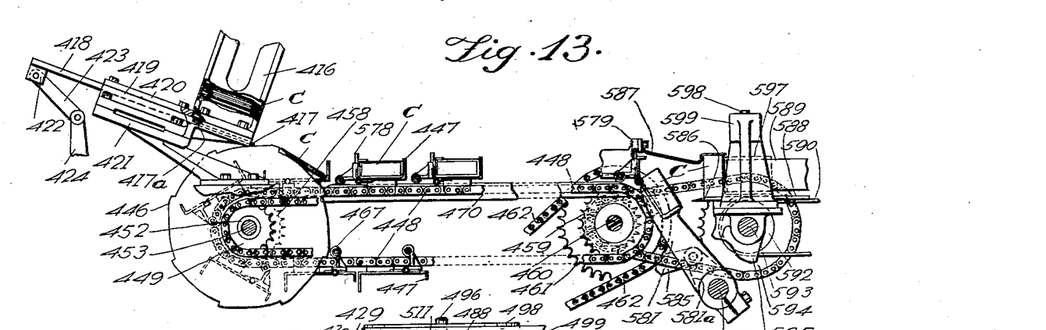
Fig. 13 is a fragmentary view of a front elevation of the cartoning unit, showing the carton feeding, carton opening, carton transferring and carton ejecting mechanisms.

The package, when leaving the tower, drops into a swinging pocket formed by spaced strips 346 and 347 and open at the top and bottom (Figs. 11 and 12), fastened to a bracket 348 mounted on a shaft 349 supported by a bracket 350 on the table 70. To the top of the bracket 350 is attached the quadrant shaped discharge plate 351 along which the bottom side of the package slides during swinging of pocket 346—347 and whence it drops onto the angular support 353, and is supported by the vertical shelf 353a thereof. The support swings on shaft 354, thereby turning the shelf so the package falls flat upon the conveyor table 355 with the sealed flap P' up and pointing in the opposite direction from the motion of the conveyor chains 356. The left portions of Figs. 11 and 12, which correspond to the right hand tower of Fig. 1, show the transfer pocket 346—347 in position ready to receive a package, and the right portions of Figs. 11 and 12, which represent the left hand tower, show the transfer pocket in its delivery position.

The pocket 346—347 receives its oscillating motion through a bell crank cam lever 357 which swings on a shaft 358 supported by the pedestals of the machine and has a roller 359 actuated by a cam 360 mounted on the shaft 79. The cam lever 357 has an arm 361 terminating in a gear segment, which meshes with the bevel pinion 362 mounted on shaft 349. The support 353 is connected in any suitable manner to the arm 361, oscillating so that shelf 353a is horizontal on delivery of the package and thereafter tilts, as by a bar 363 mounted on arm 361 which actuates the angular support 353 by means of link 364 loosely connected, so as to permit lateral movement, to the bar 363 and a lever 365 mounted on shaft 354. The oscillation of arm 361 to rotate the pocket into delivery position is such that the bar 363 is most distant from the pivot 354 and as a result holds the shelf in horizontal position during delivery.

The conveyor chains 356 (Fig. 12) carry pushers 367, which slide on the conveyor table 355. The bars constituting this table are supported by cross bars 368 and blocks 369 fastened on table 70. The conveyor chains 356 run over sprockets 370 and 371 (Figs. 1, 2, 3, and 14). Sprockets 370 are mounted on shaft 372 supported by a bracket 373 attached to the pedestal 72, and the sprockets 371 are mounted on a shaft 374 supported by the walls 375 and 376 of the cartoning unit.

Intermittent drive for feed belt

The means by which the feed belt 35 receives intermittent motion from the continuously driven shafts 75 and 79 of the wrapping tower will be described at this point (Figs. 1 and 4).

A pinion 377 mounted on the main shaft 75 drives a spur gear 378, which is fastened to a gear 379, and together with it is loosely mounted on shaft 79. The spur gear 378 meshes with a spur gear 380, which together with a crank lever 381, is mounted on a stud 382 supported in a bearing 383 on the pedestal 76. The crank lever 381 is connected with one arm of a bell crank 384 by the connecting rod 385. The bell crank 384 is loosely mounted on the shaft 79 and on its other arm carries spur gears 386 and 387, which are fastened together and mounted loosely on stud 388 on said other arm. The spur gear 387 is driven by the spur gear 379, and spur gear 386 meshes with a spur gear 389 which, together with a sprocket 390 attached to it, is loosely mounted on shaft 79. The crank lever 381 operates the bell crank 384 in the direction of the arrows shown in Fig. 4. The movement of the bell crank lever 384 causes the gear 387 to transmit rotation to the gear 386, which moves the gear 389 and thereby turns the sprocket 390 which, by a chain 391, actuates a sprocket 392 mounted on the shaft 393. Shaft 393 carries a bevel gear 394, which meshes with the bevel gear 395 mounted on the shaft 49, thereby producing forward motion of belt 35. As soon as bell crank 384 swings back into its former position and then moves in the same direction as gear 379, the gear 387 will stand still so that gear 386 rolls partly around gear 389 without affecting the sprocket 390.

The belt 35 will then stand still during this period which is timed to occur while the biscuits are being transferred by the pusher 125 from the belt into the towers.

Carton-feed

The collapsed cartons C are stacked in a magazine attached to the cartoning unit and are ejected one by one as each biscuit package arrives at the cartoning unit. See Figs. 1a, 2, 13, 14, 15 and 16. The packages forwarded by the conveyor chain pushers 367, before entering the cartoning unit, engage with the feeler plate 396 which controls the ejection of cartons from the carton magazine. This feeler plate swings on a stud 397 in a bracket 398 attached to the side wall 375. The incoming package lifts the feeler plate 396, which forms one arm of a bell crank lever, thereby bringing the other upright arm 399 of the lever in engagement with an arm of a normally oscillating lever 400. This lever is mounted on a shaft 401 supported by the bracket 398, to which shaft is also secured a bell crank lever 402, one arm of which is reciprocated through rod 403 by cam lever 404 swinging on stud 405, and the other arm of which is connected to link 440 and thence to pawl lifter lever 434. An arm 406 of cam lever 404 has the cam roller 407, which is pressed against the circumference of cam 408 by a spring 409 mounted on a post extending from shaft 410. The cam 408 is mounted on a shaft 411 supported in bearings 412 attached to the under sides of the walls 375 and 376, and is driven by means of a chain 413 which runs over a sprocket 414 mounted on a shaft 415.

By its engagement, arm 399 stops the up-and-down motion of lever 400 and thus the pawl lifter 434, thereby, by means which will now be described, ejecting a carton from magazine 416. Ejecting plate 417, which projects into the carton magazine and partly supports the stacked cartons, is provided with projecting rib 417a forming an abrupt shoulder which pushes the bottom carton out of the magazine. The plate 417 is attached to a plunger 418 which slides in a frame 419 having top guides 420, the frame 419 being attached to a bracket 421 affixed to the side walls 375 and 376 of the cartoning unit. The frame 419 also supports the magazine 416. Plunger 418 has a block 422 which is connected by a link 423 with a lever 424 secured to a shaft 425 on which is loosely mounted midway between its ends the lever 426, continuously oscillated by a rod 427 connected with crank lever 428 on shaft 410, the lever 426 having at its upper end a slotted segment 426a. The crank lever 428 is operated by crank 429 on shaft 411 through the roller 430. Ejecting lever 431, fixedly mounted on shaft 425, has the pawl or dog 432 pivoted thereon by stud 433. The bell crank pawl lifter lever 434a swings on a stud 435 in a bracket 436 attached to the pedestal 437 which, together with a pedestal 438, supports the side walls 375 and 376 and the base plate 439 of the cartoning unit. Pedestal 437 also forms the support for one end of shaft 425, the other end of which is journalled in the bearing 366. Bell crank levers 402 and 434 are connected by means of link 440 and oscillating lever 434 to cause descent of the pawl lifter arm 434a which extends over the end of the pivoted pawl distant from the segment 426a to periodically lift the opposite end of the pawl off the segment 426a. The pawl 432 normally rides on the circular periphery of the segment 426a on lever 426, being urged against the periphery by the spring 441, the cam surface having the slot 442 for engagement with said pawl.

Accordingly, as long as no package lifts the feeler plate 396, the lever 431 carrying pawl 432 remains stationary, while the lever 426, with its slotted sector 426a and the knockout lever 434, continue to oscillate. The pawl lifter arm 434a of the lever 434 extends over the pawl 432, when the latter is in its rest position, and is arranged to oscillate so that the arm 434a is in its low position, thereby lifting the pawl 432 off the surface of the sector 426a at the time when the slot 442 thereof passes under the pawl. Hence, as long as the bell crank 434 continues to oscillate, the pawl will not enter the slot 442 and the ejector lever 431 will not partake of the motion of the lever 426. When, however, a package lifts the feeler plate 396 as a result of the engagement of arm 399 with lever arm 400, the oscillation of the bell crank lever 434 is stopped with the pawl lifter 434a in a high position, and hence on the next passage of the slot 442, the pawl 432 will drop therein and the ejector plate will be driven by the movement of lever 426 to eject a carton to receive the same package which operated the feeler plate.

A spring 443 on shaft 425 presses against bracket 436 and lever 424, thereby exerting a pressure on lever 424 and thus prevents turning of shaft 425 as long as lever 426 swings loosely on it.

*Carton opening and forwarding means*

The ejected carton C is guided out of the magazine 416 into the conveyor pockets by a chute consisting of side walls 444 and by the bottom plate or tongue 445 projecting between the side walls and attached to the magazine (Figs. 1a and 2) and at the same time lands on top of two rotating discs 446 (Fig. 13) having ratchet like tooth projections extending into the spaces between the bottom plate and side walls, which carry the cartons into pockets 447 of conveyor chains 448. The discs 446 are attached to sprockets 449, which are driven by means of chains 450 from sprockets 451. The sprockets 449 run loosely on bushings 452 mounted on a shaft 453 and are held by bearings 454 attached to the side walls 375 and 376. The shaft 453 is supported in adjustable bearings 455 slidably fastened to the side walls 375 and 376. Arms 456 mounted on the bearings 454 carry idler sprockets 457. The conveyor chains 448 run over sprockets 458 and 459, the former mounted loosely on shaft 453, and the latter fastened on a shaft 460 supported in the side walls 375 and 376. Shaft 460 has a sprocket 461 which is driven by a chain 462 from a sprocket 463 on the shaft 415.

Figure 27:
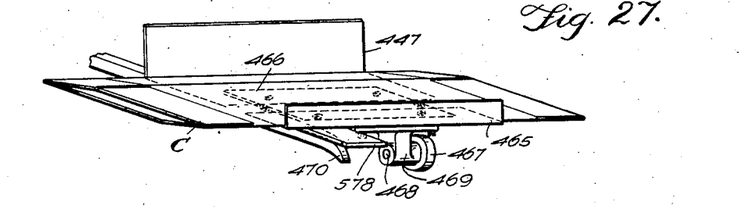
Figs. 27 and 28 are perspective views showing the carton opening mechanism.
Figure 28:
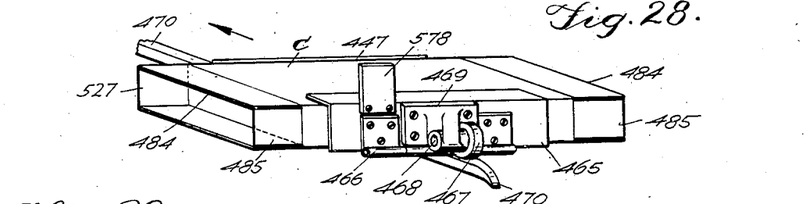

The conveyor pockets (Figs. 27 and 28), have a fixed bottom-and-end angle 447 and a swinging bottom-and-end angle 465. The two angles 447 and 465 are hinged together by the hinge 466. As soon as the carton C has entered the pocket, a roller 467, located on stud 468 in bracket 469 which is attached to angle 465, engages a rail 470, thereby lifting angle 465 and closing the pocket, whereby the collapsible carton C is opened through the inward and upward movement of the edge engaging portion of this angle which thus clamps the carton against angle 447 in open position, as shown in Fig. 28.

*Package inserting means*

At this stage, the package and the open ended carton are being forwarded by their respective conveyors in parallel paths and at the same rate of speed, with an end of the package opposite, or in juxtaposed relation to an open end of the carton.

The package B, after leaving the feeler plate, is held flat against the conveyor chain pushers 367 by means of a presser plate 471 hinged on a stud 472 in an arm 473 (Fig. 17). This arm is adjustably mounted on a shaft 474 in a bracket 475 attached to the side wall 375. A spring 476 presses the plate 471 against the package, and an adjustable stop screw 477 limits its motion.

Figure 29:
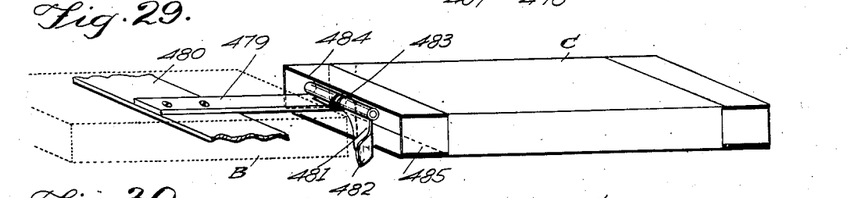
Figs. 29 and 30 are perspective views showing details of the package inserting device.
Figure 30:
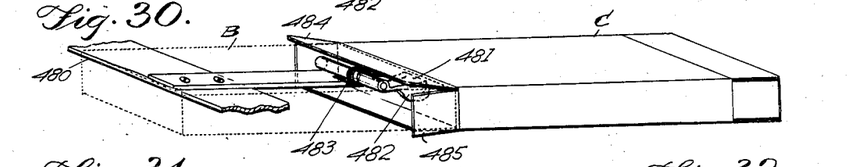

From its position under the presser plate, the package is propelled by the depending lugs 478a of a star wheel 478 (Figs. 1a and 2) into the opened carton. The six armed star wheel which is intergeared with the conveyor drives of the package and carton conveyors, and is so timed that one of the lugs sweeps just in front of plate 471 engaging the end of the package coming from under the plate and then sweeps across the conveyor 356 between each successive pair of pusher members 367, pushing the package well into the juxtaposed carton. While being so transferred, the package is guided by top strip 479 (Figs. 29 and 30) fastened to a bar 480 which on its end has a hinged plate 481 with a lug 482 and a pushdown spring 483. The advancing package hits against plate 481 and lifts it up, thereby raising the upper flap 484 of the carton. At the same time, lug 482 engages with the trailing side flap 485 of the carton and holds it open for the reception of the package.

Figure 14:
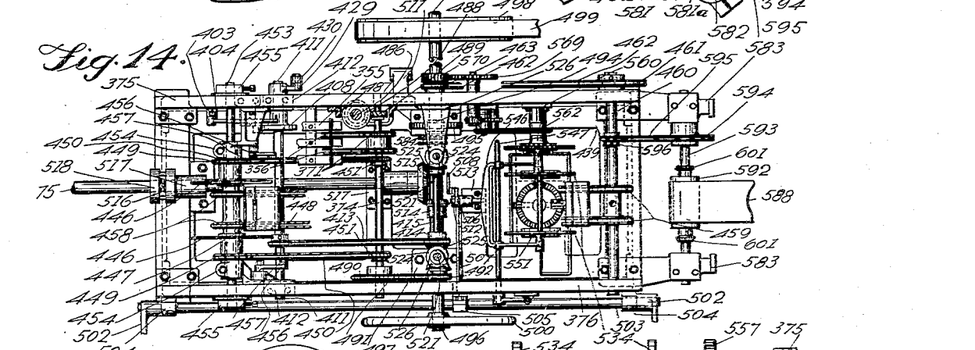
Fig. 14 is a detail plan view showing the driving parts of the cartoning unit.
Figures 15, 16:
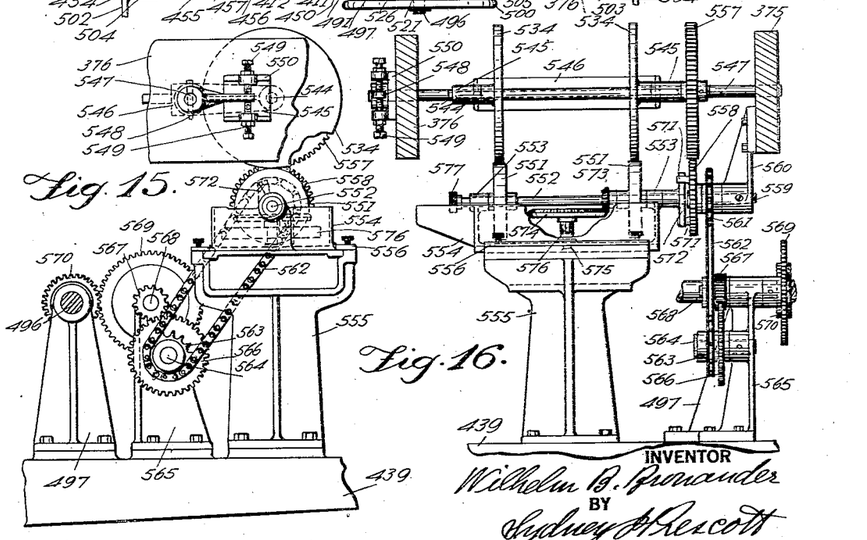
Fig. 15 is a detail front view in side elevation of the carton pasting apparatus.
Fig. 16 is a front elevation of the same.

The star wheel 478 is mounted on a shaft 486 held in a bracket 487 attached to the side wall 375. The shaft 486 has a spiral gear 488 driven by a spiral gear 489 on a shaft 374, which has a sprocket 490 driven by a chain 491 from a sprocket 492 on the shaft 415. The shaft 415 is supported in bearings 493 fastened to the under sides of the side walls 375 and 376, and has a spur gear 494 meshing with a gear 495 mounted on a motor driven shaft 496 supported in brackets 497 on the base 439 (Fig. 14). A pulley 498 mounted on the shaft 496 is connected by a belt 499 with the pulley of the driving motor. Hand wheels 500 mounted on shaft 496 permit turning the machine by hand when clutch 501 is disengaged from pulley 498. A clutch 501 for starting or stopping the entire wrapping and cartoning machine is actuated by handlevers 502 fastened on a shaft 503 in bearings 504 attached to the pedestals 437 and 438. A lever 505 clamped to the shaft 503 is connected with one end of a double arm lever 506 by a rod 507 (Fig. 14), while a rod 508 connects its other end with a clutch operating lever 509, which swings on a shaft 510 in a bracket 511 on the side wall 375. The double arm lever 506 swings on a stud 512 held in a bracket 513 attached to the base 439. The shaft 496 has a bevel gear 514, which meshes with a bevel gear 515 on the shaft 516 supported in brackets 517 on the base 439. Couplings 518 connect the shafts 75 with the shaft 516.

*Carton closing and sealing devices*

Figures 1A, 1B:
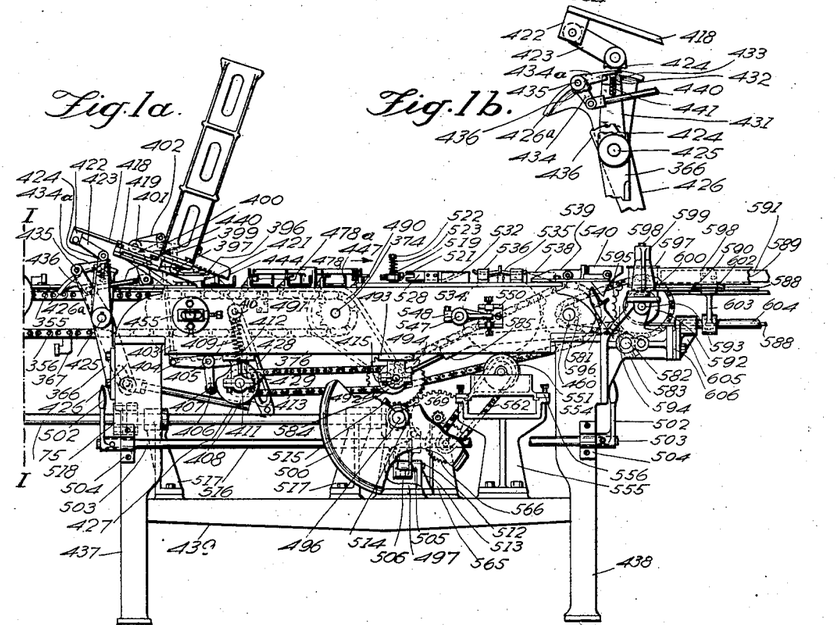
Figure 2:
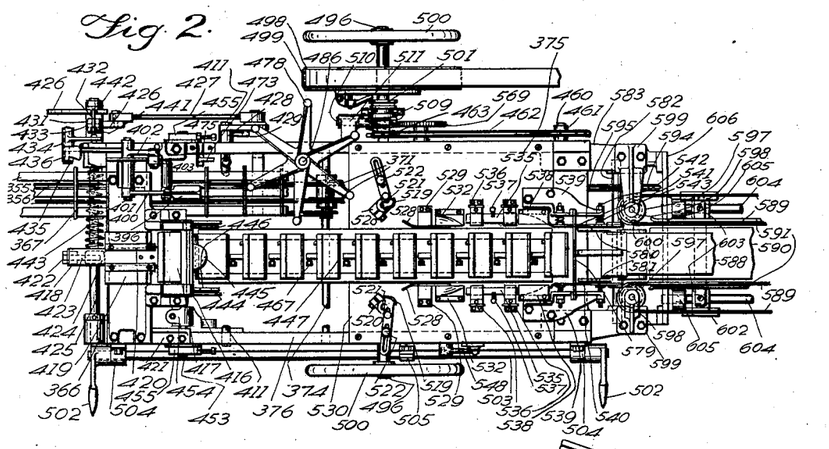
Figure 31:
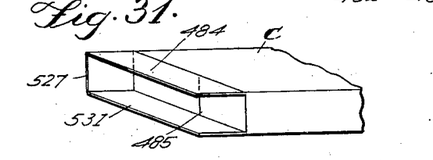
Figs. 31 to 34 are perspective views showing the successive stages of tucking and sealing the flaps of the filled cartons.

After the biscuit package has been propelled into the carton, the rearward or trailing side flaps 485 of the latter (Fig. 31) are folded in by the tuckers 519 (Figs. 1a and 2). These tuckers are eccentrically fastened to rotating clamps 520 which are held by shafts 521, rotating in a counter clockwise direction as viewed in Fig. 2. The tuckers slide on studs 522 which have springs 523 pressing the tuckers against the sliding surfaces, the operation of which causes the tuckers to fold the flaps 485 from the side and rear. Shafts 521 are rotated by bevel gears 524 meshing with bevel gears 525 mounted on the drive shaft 415 journalled in wall brackets 526 attached to the side walls 375 and 376. The forward side flaps 527 (Fig. 31) hit against strips 528 fastened on blocks 529 secured to a plate 530 attached to the side walls 375 and 376, the flaps 527 being thereby tucked in.

Figure 32:
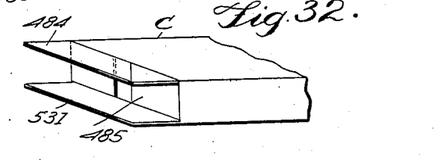
Figure 33:
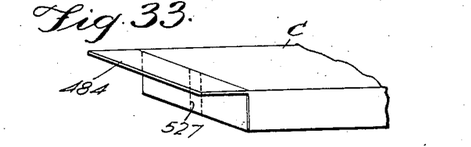
Figure 34:
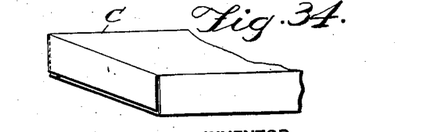

The folding of the lower end flaps 531 (Fig. 32) is performed by blocks 532 having upwardly curved and forwardly converging surfaces attached to table plate 530, and upon the carton emerging from these blocks, its upper end flaps 484 pass over paste wheels 534 and thereby have paste applied to their under sides. The paste wheels 534 are partly covered by guard plates 535 which are hinged on blocks 536 and are locked in place by lock bolts 537. After the paste is applied, the cartons engage with the downwardly curved and forwardly converging blocks 538 which force the pasted top flap 484 down over the previously folded flaps, thereby sealing the carton (Fig. 34). Brackets 539 attached to plate 530 support fixed side guide 540 and movable side guides 541 which prevent the freshly pasted cartons from opening. The side guide 541 is resiliently mounted on bolts 542 which have springs 543 to yieldably hold the same against the carton end.

The paste wheels 534 (Figs. 15 and 16) are mounted on a shaft 544, which is held in arms 545 of a frame 546. This frame is adjustably mounted on a shaft 547 supported in the side walls 375 and 376. An arm 548 mounted on the shaft 547 is held between adjusting screws 549 in a bracket 550 attached to the side wall 375. Adjustment of the screws 549 causes an up or down movement of the arms 545 to regulate the contact of paste wheels 534 with paste drums 551. The latter are mounted on a shaft 552 journalled in bearings 553 of a paste receptacle 554, which is slidably attached to a bracket 555 and held in place by bars 556. The paste wheels 534 are driven by a spur gear 557 which meshes with a gear 558 on a stud 559 held in a bearing 560 affixed to the side wall 375. A gear 558 is driven by a sprocket 561 attached to it, the latter in turn being driven by a chain 562 from a sprocket 563 on a stud 564 in a bracket 565 on the base 439. To the sprocket 563 is attached a spurgear 566 which is driven by a pinion 567 mounted on a shaft 568 in a bearing 565, the shaft 568 being driven by a spur gear 569 meshing with a spur gear 570 mounted on the drive shaft 496.

When the paste receptacle 554 is replaced after cleaning, projecting lugs 571 of the spur gear 558 engage with a drive lever 572 mounted on the shaft 552 and operate, by means of a bevel gear 573 on shaft 552, a bevel gear 574 on a stud 575 in the paste receptacle 554, thereby actuating paddles 576 which stir the paste in the receptacle. A knob 577 on the shaft 552 permits turning of the drive lever 572 to bring it into proper angular position to engage with the lugs 571.

*Carton ejecting and delivery means*

After the carton is sealed, the conveyor pocket must be opened to permit the filled carton to be ejected. For this purpose, a lug 578 (Figs. 13 and 28) attached to the hinged pocket angle 465 is forced to hit against the stationary bar 579 located in the path of the lug, thereby tilting the angle piece 465 and allowing the package to advance to a pair of oscillating transfer levers 580 and 581, having angular package supporting surfaces at the upper ends, mounted on shaft 582 in brackets 583 attached to pedestals 438. Shaft 582 is rocked by the eccentric 584 mounted on shaft 415 and connected with transfer lever 581 by the bar 585 and a lever 581a secured to the shaft.

The sealed carton, having been carried by the transfer arms 580 and 581 to the delivery table 586 (Fig. 13), is held down by a spring 587 fastened on a cross bar 579 until the next following ejected carton pushes it upon a bottom delivery belt 588 and between side delivery belts 589. The bottom belt 588 rests on plate 590, and the side belts are guided by side plates 591. The belt 588 is driven by pulley 592 on a shaft 593 in brackets 583, a sprocket 594 on this shaft being driven by a chain 595 from a sprocket 596 on shaft 460. The belts 589 are driven by pulleys 597 on shafts 598 supported in bearings 599 attached to the brackets 583. The pulleys 597 (Figs. 2 and 13) are driven by bevel gears 600 on the shafts 598 meshing with bevel gears 601 on the shaft 593. To prevent the side belts from sagging, they are supported by rails 602 (Figs. 1a and 2) attached to brackets 603, to which are also fastened the bottom plate 590 and the side guide plates 591. The brackets 603 are held by rods 604 supported in bearings 605 attached to a cross bar 606 on brackets 583.

It is noted that in the construction of the cartoning machine illustrated and described, the packages and cartons are continuously forwarded and the packages are inserted during this forwarding, thus obviating the complication, delay and wear and tear attendant intermittent operation of the same.

It is also observed that due to the structure by which two selectively operable wrapping units cooperate with one feed belt and cartoning unit, that the capacity of the machine is nearly doubled without doubling the feeding and cartoning means, since the capacity of this machine is limited by the relatively slow and complex process of wrapping. At the same time, such an arrangement minimizes the possibility of breakdowns and the machine can be operated when either wrapping unit is being serviced or repaired, the clutch of that unit being thrown out and the biscuits fed down the lane on feed belt 35 leading to the other unit.

In view of the foregoing, further description of the operation of the machine is deemed unnecessary and is omitted in the interests of brevity.

What is claimed is:

1. In a wrapping and cartoning machine in combination, wrapping mechanism, means for feeding articles, means co-operating with the feeding means to successively collect said articles into groups having a predetermined number and arrangement of the articles, means to transfer said groups to the wrapping mechanism, means for supplying collapsed cartons having overhanging end flaps, means coacting with said mechanism and said supply means to open the collapsed cartons and insert the wrapped groups into the opened cartons, and means to thereafter close and seal said cartons, said carton closing and sealing means including devices for folding in the overhanging end flaps of the cartons.

2. In a packaging machine in combination, a plurality of wrapping mechanisms, means for feeding articles in a plurality of rows, means co-operating with the feeding means to successively collect said articles in each row into groups having a predetermined number and arrangement of the articles, and means set into operation by the completion of each group to transfer said group to one of said wrapping mechanisms.

3. In a packaging machine in combination, a plurality of wrapping mechanisms, means for feeding articles in a plurality of rows, means co-operating with the feeding means to successively collect said articles in each row into groups having a predetermined number and arrangement of the articles, and means set into operation by the completion of each group to transfer said group to one of said wrapping mechanisms, said collecting means including a stop against which the articles are fed, and said transfer means including means controlled by pressure of the articles against said stop.

4. In a packaging machine in combination, a plurality of wrapping mechanisms, means for feeding articles in a plurality of rows, means cooperating with the feeding means to successively collect said articles in each row into groups having a predetermined number and arrangement of the articles, and means set into operation by the completion of each group to transfer each of said groups to one of said wrapping mechanisms, said wrapping mechanisms including driving means controlled by the completion of a group in one of said rows.

5. In a packaging machine in combination, wrapping mechanism, means for feeding articles, means cooperating with the feeding means to successively collect said articles into groups having a predetermined number and arrangement of the articles, and means set into operation by the completion of each group to transfer said group to the wrapping mechanism, said wrapping mechanism including a tower, means for conveying a succession of the groups up in said tower and then down again, and coacting sealing means operative to seal the wrapped groups near the beginning of their passage in the tower to permit setting of the seal during said passage.

6. A charging device for wrapping machines comprising means for feeding articles, a plurality of rows of means cooperating with the feeding means to successively collect articles in each row into groups having a predetermined number and arrangement of the articles, and means set into operation by the completion of a group in each row to transfer that group to the wrapping machine.

7. A charging device for packaging machines comprising means for feeding articles, a plurality of rows of means cooperating with the feeding means to successively collect said articles in each row into groups having a predetermined number and arrangement of the articles, and means set into operation by the completion of a group in each row to transfer that group to the packaging machine, said feeding means including an intermittently driven feed belt on which the articles rest and said collecting means including a stop against which the articles are fed.

8. A charging device for packaging machines comprising means for feeding articles, a plurality of rows of means cooperating with the feeding means to successively collect said articles in each row into groups having a predetermined number and arrangement of the articles, and means set into operation by the completion of a group in each row to transfer that group to the packaging machine, said feeding means including a support on which said articles rest and said transfer means including a reciprocating member, and means operating the same to push a group off the support on its forward movement and to clear articles on the support on its return movement.

9. In a packaging machine in combination, means for feeding a group of articles to be wrapped, mechanism to wrap and deliver said group of articles, means for supplying cartons in collapsed condition, and means cooperating with said mechanism and said supply means to open the cartons and insert the wrapped articles therein, said inserting means including means for forwarding the groups from the wrapping means, and said carton supplying means including means set into operation by passage of each group along the forwarding means for ejecting a carton for the same group in collapsed condition.

10. In a packaging machine in combination, means for feeding articles to be wrapped, mechanism to wrap and deliver said articles, means for supplying cartons in collapsed condition, and means cooperating with said mechanism and said supply means to open the cartons and insert the wrapped articles therein, said cartons having open upper and side flaps past which the articles are inserted and means operated by the approaching articles for bending said upper and side flaps out of the path of said articles.

11. Mechanism for inserting traveling objects in cartons comprising means for forwarding the objects and open cartons in parallel paths with a carton opening next to each object and means for pushing the objects into the cartons during said forwarding, said pushing means including a star wheel having arms engaging said objects, and means rotating said wheel in timed relation to the forwarding movement.

12. In a wrapping machine in combination, means for feeding articles in a plurality of rows, means cooperating with the feeding means to successively collect said articles in each row into groups having a predetermined number and arrangement of the articles, a plurality of mechanisms for wrapping said groups and self stopping driving means for each of said mechanisms set into operation by completion of a group in one of said rows.

13. In a wrapping machine in combination, a tower, means for continuously conveying a succession of articles having wrappers with projecting flaps up in said tower and then down again, said conveying means including a guideway of inverted U shape, and said tower having coacting wrapping devices and oscillating and stationary heat sealing devices along said guideway to fold and seal said projecting flaps.

14. The combination with a plurality of wrapping machines, of a single feed mechanism extending past said machines and supporting and forwarding articles in two rows, means for transferring articles to be wrapped from each of the rows of articles on said feed mechanism to each of the machines, means for selectively operating said machines, and means for intermittently operating said mechanism to stop the feed while articles are being transferred to said wrapping machines from said rows.

15. The combination with a plurality of wrapping machines, of a cartoning device, said cartoning device including a single forwarding mechanism extending past each of said machines and arranged to convey cartons to receive and forward wrapped articles therefrom and means for selectively operating said machines.

16. In a packaging machine in combination, means for feeding articles to be wrapped, mechanism to assemble and wrap a plurality of said articles in a single package, means for supplying cartons having overhanging end flaps in collapsed condition, means cooperating with said mechanism and said supply means to open the cartons and insert the wrapped articles therein, and means to fold in and seal the overhanging end flaps of the carton.

17. In a packaging machine in combination, means for feeding articles to be wrapped, mechanism to assemble and wrap a plurality of said articles in a single package, means for supplying cartons having overhanging end flaps in collapsed condition, means cooperating with said mechanism and said supply means to open the cartons and insert the wrapped articles therein, and means to fold in and seal the overhanging end flaps of the cartons, said inserting means including means for forwarding the wrapped groups and the cartons in parallel paths and juxtaposed relation, and means forcing the groups into the juxtaposed cartons.

18. A device for setting up and filling cartons comprising a continuously moving conveyer provided with movable walled pockets adapted to open up a collapsed carton, a second conveyer having a portion of its travel adjacent the first and continuously moving at the same speed, said second conveyer having means thereon for carrying a succession of articles to be inserted into opened cartons, and a pivoted pusher engageable with articles on the second conveyer to sweep articles therefrom and into opened cartons during the continuous movement of both conveyers.

19. A device for setting up, filling, and closing cartons comprising a continuously moving conveyer provided with movable walled pockets adapted to open up a collapsed carton, a second conveyer having a portion of its travel adjacent the first and continuously moving at the same speed, said second conveyer having means thereon for carrying a succession of articles to be inserted into opened cartons, a pivoted pusher engageable with articles on the second conveyer to sweep articles therefrom and into opened cartons during the continuous movement of both conveyers, and a succession of flap folding devices positioned for operation on both sides of the first conveyer during the continuous movement thereof.

20. A device for filling and closing cartons comprising a continuously moving conveyer provided with carton holding pockets, a second conveyer having a portion of its travel adjacent the first and continuously moving at the same speed, said second conveyer having means thereon for carrying a succession of articles in registry with the pockets of the first conveyor, a pusher having a path of motion one component of which is in the direction of travel of the conveyors and movable at timed intervals to sweep articles from the second conveyer into cartons in the pockets of the first conveyer during the continuous movement of both conveyers, and means adjacent the first conveyer for folding the remaining flap of the cartons carried thereby.

21. In a packaging machine, in combination, a plurality of wrapping mechanism, means for feeding articles in a plurality of rows, means cooperating with said feeding means to collect the articles in each row into groups having a predetermined number and arrangement of the articles, and means set into operation by the completion of each group to transfer said group to one of said wrapping mechanism, each of said wrapping mechanism including means for forwarding a group from said transfer means, stationary folders coacting with said forwarding means, and means for feeding wrapping material into the range of action of said transfer means ahead of said folders.

22. Means for simultaneously transferring articles and folding flaps of a wrapper about the same, comprising a swinging support, a preliminary folding pocket for partially enfolding the articles in a wrapper, means for horizontally moving articles and an associated wrapper through said pocket onto said support, means for swinging said support to vertical position, mechanism for carrying the partially enfolded articles off said support while the latter is in vertical position, and means for completing the enfoldment of the partially enfolded articles after they are carried off said support by said mechanism.

WILHELM B. BRONANDER.